(12) United States Patent
Kobayashi

(10) Patent No.: US 10,151,665 B2
(45) Date of Patent: Dec. 11, 2018

(54) LENS METER

(71) Applicant: TOPCON CORPORATION, Tokyo (JP)

(72) Inventor: Mariko Kobayashi, Tokyo (JP)

(73) Assignee: TOPCON CORPORATION, Tokyo (JP)

(*) Notice: Subject to any disclaimer, the term of this patent is extended or adjusted under 35 U.S.C. 154(b) by 0 days.

(21) Appl. No.: 15/924,803

(22) Filed: Mar. 19, 2018

(65) Prior Publication Data

US 2018/0275014 A1    Sep. 27, 2018

(30) Foreign Application Priority Data

Mar. 27, 2017  (JP) ................. 2017-061600

(51) Int. Cl.
*G01B 9/00*       (2006.01)
*G01M 11/02*      (2006.01)

(52) U.S. Cl.
CPC ............... *G01M 11/0235* (2013.01)

(58) Field of Classification Search
CPC ......... G01M 11/0235; G01M 11/0228; G01M 11/0221; G01M 11/0242; G01B 11/255
USPC ................................. 356/124–127
See application file for complete search history.

(56) References Cited

U.S. PATENT DOCUMENTS 5,303,023 A * 4/1994 Portney ............. G01M 11/0242
                                              356/124.5
5,414,505 A   5/1995 Ikezawa et al.
5,973,772 A * 10/1999 Fukuma ............. G01M 11/0235
                                              33/200
6,493,073 B2 * 12/2002 Epstein ............. G01M 11/0235
                                              356/124
6,556,286 B1 * 4/2003 La Fontaine ........... G03F 7/706
                                              355/55
7,075,633 B2 * 7/2006 Wegmann .......... G01M 11/0285
                                              250/201.9

FOREIGN PATENT DOCUMENTS

JP       5-215642     8/1993
JP       11-132905    5/1999

* cited by examiner

*Primary Examiner* — Hoa Pham
(74) *Attorney, Agent, or Firm* — Wenderoth, Lind & Ponack, L.L.P.

(57) ABSTRACT

A lens meter includes a measurement optical system that projects measurement light to a test lens, and receives the measurement light which has passed through the test lens, a control part that calculates an optical characteristic value of the test lens based on the received measurement light, and controls the measurement optical system, a display part that displays the optical characteristic value by control of the control part, and an imaging part that obtains a lens image of the test lens, wherein the control part generates a mapping image showing distribution of the optical characteristic value of the test lens based on the optical characteristic value and position information of a measurement position of the optical characteristic value, generates a superimposed image in which the mapping image is superimposed onto the lens image, and displays the superimposed image on the display part.

6 Claims, 9 Drawing Sheets

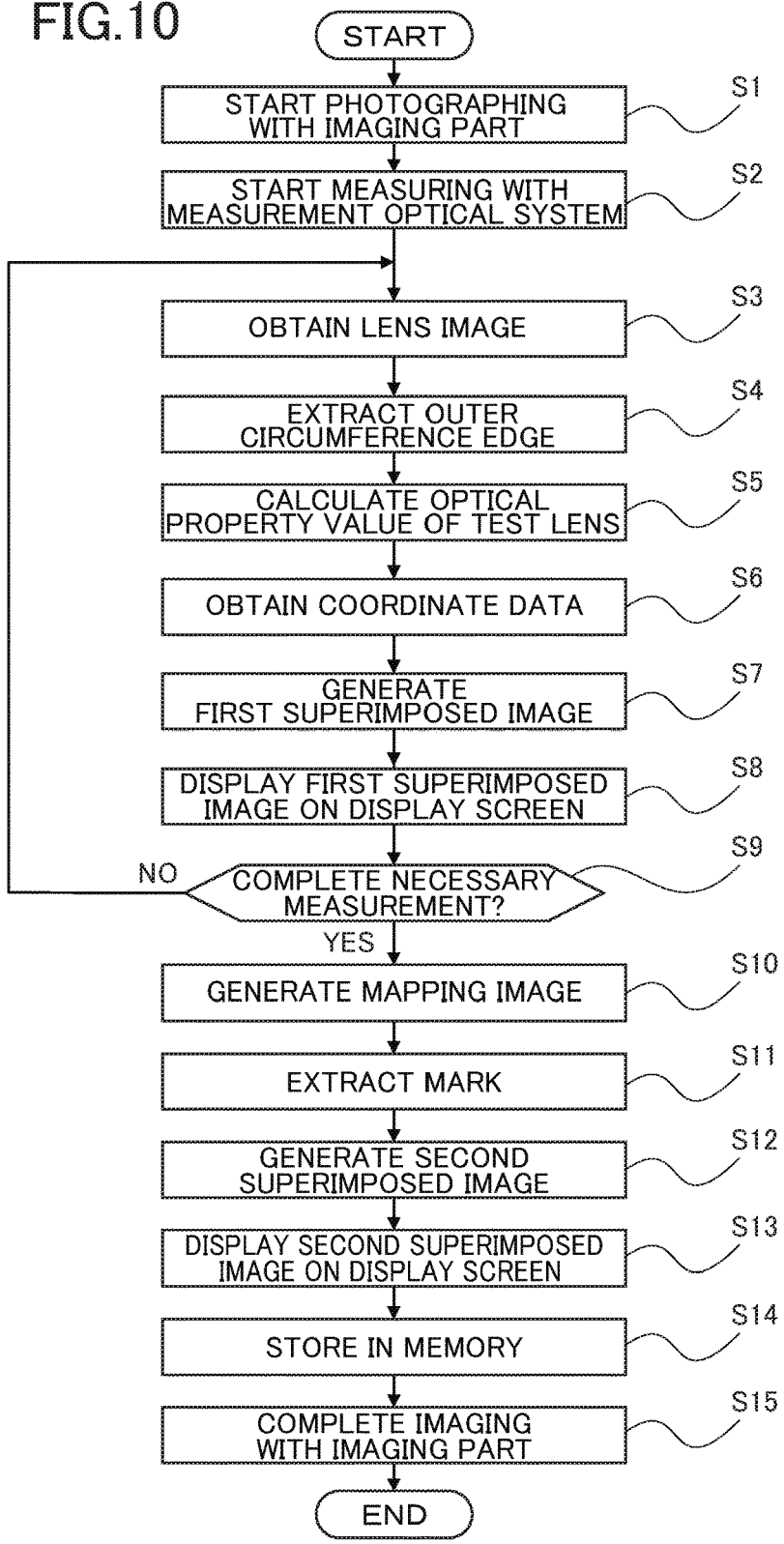

LENS METER

CROSS-REFERENCE TO RELATED APPLICATION

The present application is based on and claims priority to Japanese patent application No. 2017-061600, filed Mar. 27, 2017, the disclosure of which is hereby incorporated by reference herein in its entirety.

BACKGROUND

Technical Field

This disclosure relates to a lens meter.

Description of Related Art

A lens meter that measures optical characteristic values such as spherical power, cylindrical power, cylinder axis angle, and prism values (prism degree and prism base direction), and displays these optical characteristic values on a display section has been conventionally known (see JP H11-132905A, for example).

A lens meter that measures optical characteristic values in a plurality of measurement positions between a far-sight portion and a near-sight portion of a progressive lens, and displays a distribution of the optical characteristic values on a display part as a graph has been also known (see JP H05-215642A, for example).

However, it is difficult for the conventional lens meter to determine a positional relationship between the distribution of the optical characteristic values and a test lens, and it takes a long time for the conventional lens meter to measure especially the progressive lens while seeking a measurement position.

SUMMARY

This disclosure has been made in view of the above problems. An object of this disclosure is to provide a lens meter capable of easily determining a positional relationship between a distribution of optical characteristic values and a test lens, and obtaining a mapping image showing the distribution of the optical characteristic values by merely moving a lens.

To achieve the above object, an aspect of this disclosure provides a lens meter including a measurement optical system that projects measurement light to a test lens, and receives the measurement light which has passed through the test lens, a control part that calculates an optical characteristic value of the test lens based on the received measurement light, and controls the measurement optical system, a display part that displays the optical characteristic value by control of the control part, and an imaging part that obtains a lens image of the test lens, wherein the control part generates a mapping image showing distribution of the optical characteristic value of the test lens based on the optical characteristic value and position information of a measurement position of the optical characteristic value, generates a superimposed image in which the mapping image is superimposed onto the lens image, and displays the superimposed image on the display part.

BRIEF DESCRIPTION OF DRAWINGS

FIG. 10 is a flowchart illustrating a flow of an image control process which is executed by the lens meter of the embodiment.

DETAILED DESCRIPTION

Figure 1:
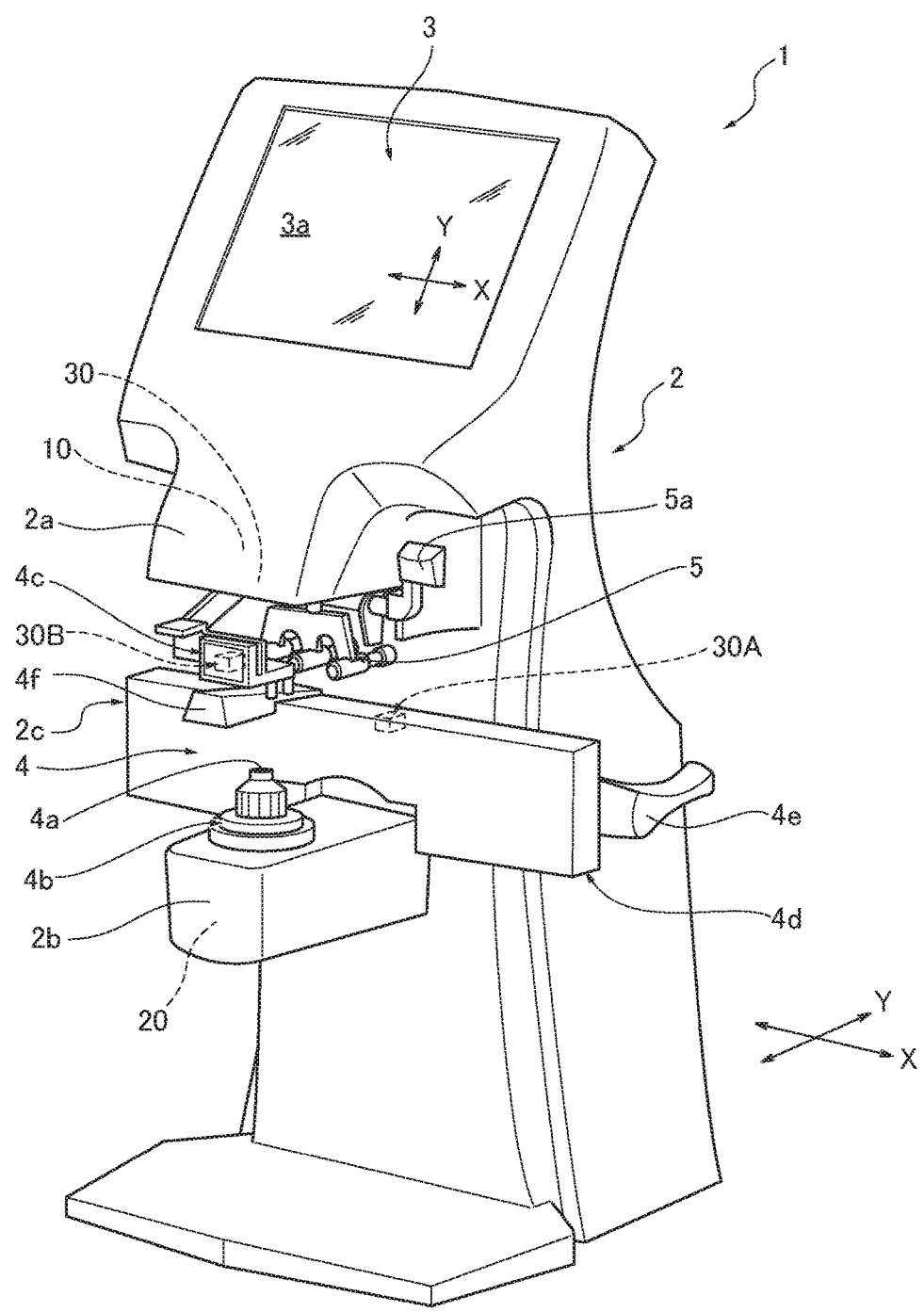
FIG. 1 is a perspective view illustrating an external appearance of a lens meter of an embodiment.

Hereinafter, an embodiment of a lens meter according to this disclosure is described with reference to the drawings.

Entire Configuration of Lens Meter

Hereinafter, an entire configuration of a lens meter 1 of the embodiment is described with reference to FIG. 1. The lens meter 1 of the embodiment illustrated in FIG. 1 measures optical characteristic values of a test lens L, and displays the optical characteristic values and a distribution of the optical characteristic values as a mapping image. This lens meter 1 includes a main body 2.

The main body 2 is provided with a display part 3 such as a liquid crystal display and an organic EL display. The display part 3 is provided in an upper part of a front surface of the main body 2. The display part 3 includes a touch panel display screen 3a. Various types of image data are displayed on the display screen 3a. The various types of image data include numerical data of optical characteristic values (spherical power, cylindrical power, cylinder axis angle, prism degree, prism base direction and the like) of the test lens L, a mapping image showing the distribution of the optical characteristic values of the test lens L, a test lens image of the test lens L (hereinafter simply referred to as a lens image), and a superimposed image in which the lens image is superimposed on the mapping image. An operation part 6 is displayed on the display screen 3a. In the operation part 6, for example, an operation button for starting and stopping measurement, a mode switching button for switching a measurement mode, and an operation button for printing a measurement result and the like are shown as icons. In addition, the operation part 6 may be for example a button or a switch appropriately provided in the main body 2. A comment bar 7 including a comment for guiding a measurement operation of a measure is displayed on the display screen 3a.

A projection optical system 10 (refer to FIG. 2) is housed in an upper part 2a of the main body 2. A light receiving optical system 20 (refer to FIG. 2) is disposed under the projection optical system 10 to face the projection optical system 10. The projection optical system 10 and the light receiving optical system 20 constitute a measurement optical system K for measuring the optical characteristic values of the test lens L.

An imaging part 30 that images an external appearance of the test lens L (refer to FIG. 2) is housed in the upper part 2a of the main body 2. A control system (refer to FIG. 4) that integrally controls each part of the lens meter 1 is provided inside the main body 2.

A lens setting space 2c in which the test lens L is set is formed in a middle part of the main body 2. A lens holding mechanism 4 and a mark stamping device 5 are provided inside the lens setting space 2c.

The lens holding mechanism 4 includes a lens supporting member 4b having an annular placement surface 4a on which the test lens L is placed, a lens pressing member 4c that presses down the test lens L placed on the lens supporting member 4b, and a lens table 4d that is place behind the lens supporting member 4b and supports the positioning of the test lens L in the lens setting space 2c. In the embodiment, a pair of the lens supporting member 4b and the lens pressing member 4c is provided. While the test lens L placed on the lens supporting member 4b is pressed to the lens table 4d, a lens table lever 4e is operated to adjust the position of the lens table 4d in the front-back direction. The test lens L is thereby moved to a set position (measurement position of test lens L relative to measurement optical axis Lm of measurement optical system K) in the front-back direction.

The lens meter 1 of this embodiment can measure, as the test lens L, for example, a circular unprocessed lens, a lens which is grinded for eyeglasses before putting in an eyeglass frame, and a lens put in an eyeglass frame. In the embodiment, a slider 4f on which a nose pad of eyeglasses is placed is supported by an upper end portion of the lens table 4d to be movable in the horizontal direction. When the test lens L is a lens put in an eyeglass frame, the nose pad of the eyeglasses is hung on the slider 4f and the eyeglasses are moved in the right-left direction together with the slider 4f, so that a desired lens can be disposed on the lens supporting member 4b, and the test lens L can be moved in a set position in the right-left direction.

Even though the test lens L is an unprocessed lens without a nose pad of eyeglasses and a lens before putting in a frame, an outer circumference edge of the test lens L is pressed to the end surface of the slider 4f and the test lens L is moved in the right and left together with the slider 4f, so that the test lens L can be moved in the set position in the right-left direction. Note that it is not always necessary to provide the slider 4f in the lens meter 1, and the configuration is not limited to the embodiment.

Figure 4:
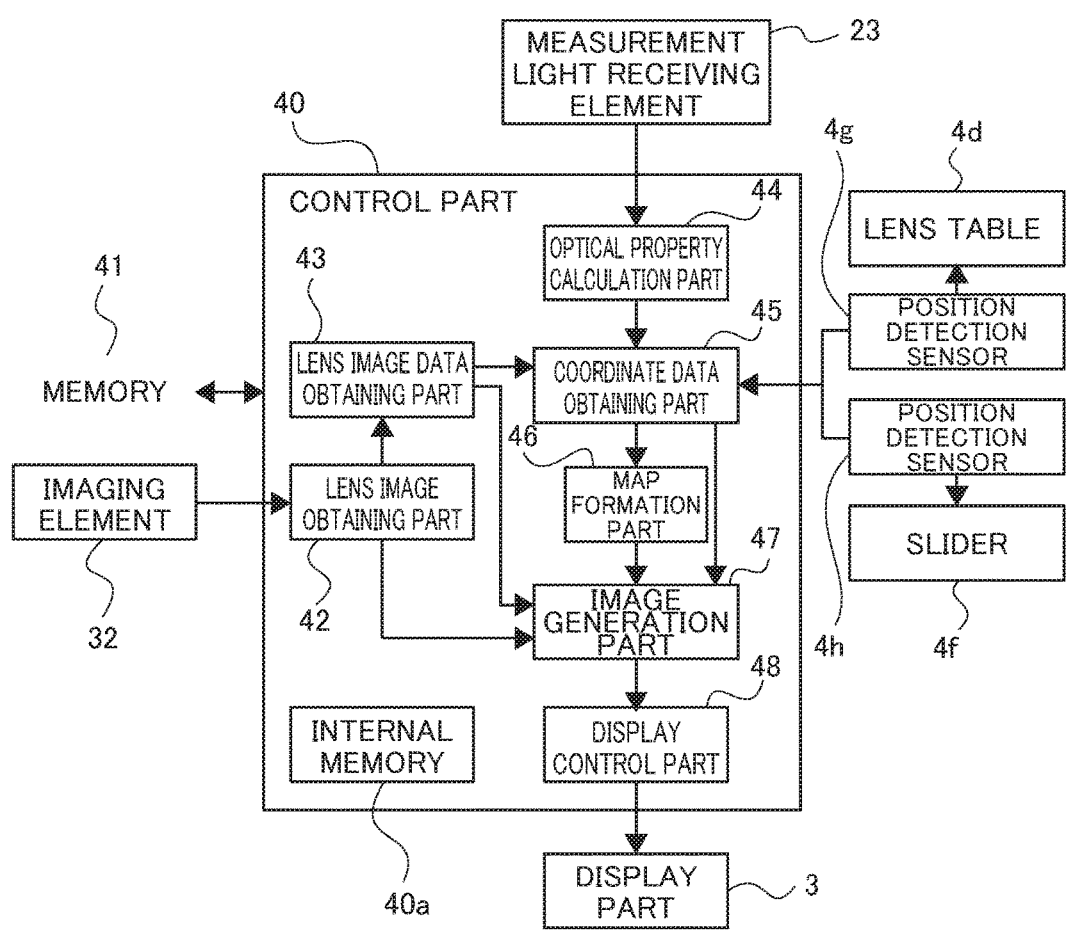
FIG. 4 is a block diagram illustrating a configuration of a control system of the lens meter of the embodiment.

The lens table 4d and the slider 4f are provided with position detection sensors 4g, 4h, respectively, such as a potentiometer (refer to FIG. 4). The position detection sensor 4g detects the position of the lens table 4d in the front-back direction (Y-axis direction). The position detection sensor 4h detects the position of the slider 4f in the right and left direction (X-axis direction). The data of each detected position is outputted to a control system.

The mark stamping device 5 rotates in the up and down direction by the operation of an axis stamping lever 5a, and stamps a mark on the test lens L held between the lens supporting member 4b and the lens pressing member 4c.

Detailed Configuration of Measurement Optical System

Figure 2:
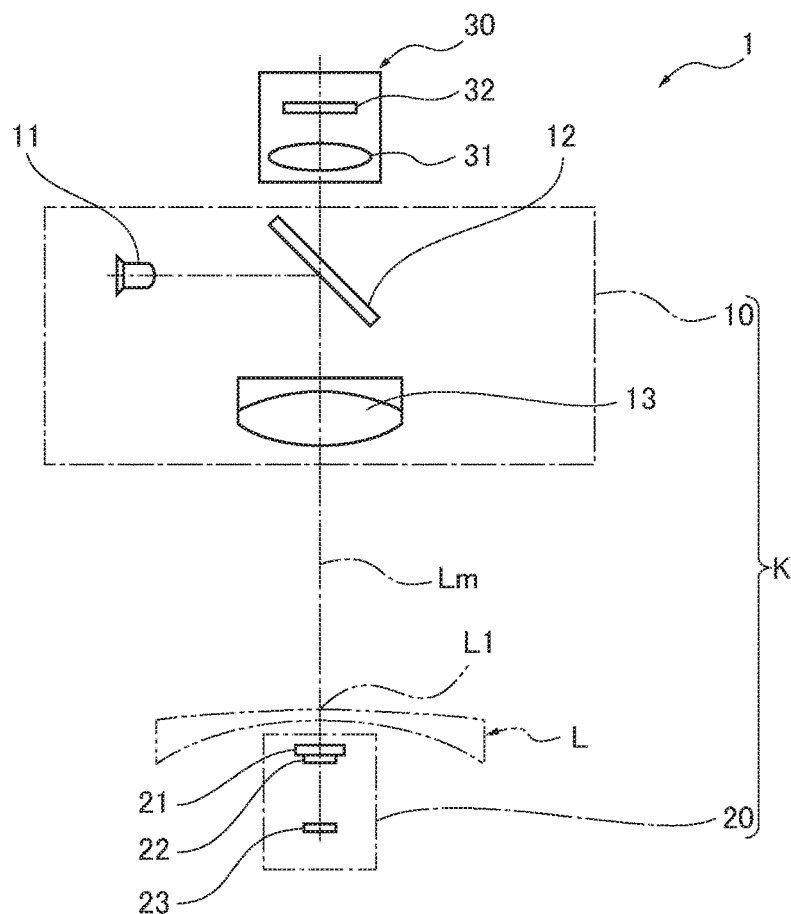
FIG. 2 is a view explaining a configuration of a measurement optical system of the lens meter of the embodiment.
Figure 3:
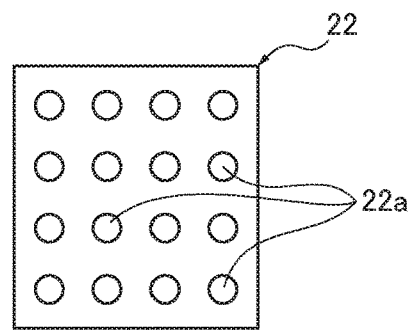
FIG. 3 is a plan view illustrating one example of a pattern plate provided in the measurement optical system of the embodiment.

Hereinafter, the detailed configuration of the measurement optical system K of the lens meter 1 of the embodiment is described with reference to FIGS. 2, 3. The measurement optical system K of the embodiment is used for measuring the optical characteristic values of the test lens L, and includes the projection optical system 10 and the light receiving optical system 20.

The projection optical system 10 is an optical system that projects measurement light to the test lens L. As illustrated in FIG. 2, the projection optical system 10 includes a light source 11 for emitting the measurement light, a half mirror 12, and a lens 13. The light source 11 includes an LED element (light emitting diode) in the embodiment. The measurement optical axis Lm of the measurement optical system K is folded by the half mirror 12, and passes through the center of the placement surface 4a (refer to FIG. 1) of the lens supporting member 4b. In the projection optical system 10 having such a configuration, the measurement light emitted from the light source 11 is modulated to parallel light having a predetermined aperture through the half mirror 12 and the second lens 14 in order, and then is projected onto the test lens L disposed on the lens supporting member 4b.

The light receiving optical system 20 is an optical system that receives the measurement light which has passed through the test lens L. The light receiving optical system 20 is disposed on the measurement optical axis Lm, and includes a filter 21, a pattern plate 22, and a measurement light receiving element 23, as illustrated in FIG. 2.

The pattern plate 22 is a pattern plate that divides the measurement light which has passed through the test lens L into a plurality of divided measurement light fluxes. The pattern plate 22 includes a pattern in which a plurality of circular openings 22a is regularly arranged, as illustrated in FIG. 3.

The measurement light receiving element 23 receives a plurality of divided measurement light fluxes by the pattern plate 22, and converts the light fluxes into electric signals (image signals) to be outputted. This measurement light receiving element 23 receives the divided measurement light fluxes as a pattern image. For example, a charged coupled device (CCD) can be used as the measurement light receiving element 23.

Detailed Configuration of Imaging Part

Hereinafter, the detailed configuration of the imaging part 30 of the lens meter 1 of the embodiment is described with reference to FIG. 2. The imaging part 30 is disposed on a straight line transmitting through the half mirror 12 from the lens 13, and images the test lens L put on the lens supporting member 4b along the measurement optical axis Lm folded by the half mirror 12. Here, the imaging part 30 is provided in a position capable of imaging a square region having a 100 mm side with the measurement optical axis Lm as the center along a plane parallel to the horizontal plane on the lens supporting member 4b. The imaging part 30 is, for example, a monocular digital camera, and includes an imaging optical system 31 and an imaging element 32.

The imaging optical system 31 includes a plurality of lenses. The imaging optical system 31 forms a subject image of the test lens L put on the lens supporting member 4b on the imaging element 32 in corporation with the lens 13 of the projection optical system 10. The imaging element 32 converts the subject image formed by the imaging optical system 31 into electric signals (image signals) to be outputted. The imaging part 30 photographs the square region with the measurement optical axis Lm as the center. The position of the measurement optical axis Lm on the imaging element 32 is thus aligned with the center of the imaging element 32.

Detailed Configuration of Control System

Hereinafter, a detailed configuration of the control system of the lens meter 1 of the embodiment is described with reference to FIG. 4. The lens meter 1 includes a control part 40 as the control system and a memory 41, as illustrated in FIG. 4. The control part 40 includes a central processing unit (CPU) and an internal memory 40a. The display part 3, the position detection sensors 4g, 4h, the operation part 6, the light source 11 of the projection optical system 10, a measurement light receiving element 22c of the light receiving optical system 20, the imaging element 32 of the imaging part 30, and the memory 41 are connected to the control part 40.

The control part 40 displays an image on the display part 3, controls the operation by the operation part 6, the operation of obtaining the position information by the position detection sensors 4g, 4h, the operation of turning on and turning off the light source 11, the operation of obtaining the image signals by the measurement light receiving element 23, the operation of obtaining the imaging signals by the imaging element 32, the process of storing a variety of information in the memory 41, and the process of reading out a variety of information.

In the embodiment, the internal memory 40a includes a random access memory (RAM). The memory 41 includes a read only memory (ROM) and an electrically erasable programmable ROM (EEPROM). A necessary control program and a variety of information are stored in the internal memory 40a and the memory 41.

The control part 40 executes the various calculation processes and the operation control of each part of the lens meter 1 by applying the control program stored in the ROM of the memory 41 to the RAM of the internal memory 40a, for example. The control part 40 operates as a lens image obtaining part 42, a lens image data obtaining part 43, an optical property calculation part 44, a coordinate data obtaining part 45, a map formation part 46, an image generation part 47, and a display control part 48 in accordance with a control program.

The lens image obtaining part 42 obtains the imaging signal inputted from the imaging element 32 of the imaging part 30, namely, a lens image imaged by the imaging part 30 from the subject image photoelectrically converted by the imaging element 32. More specifically, this lens image obtaining part 42 executes a necessary image process and processing (for example, coordinate conversion, contrast adjustment, color conversion (translucence and sepia color), brightness adjustment, filtering process) with respect to the image photographed by the imaging part 30, and obtains a desired lens image.

In the embodiment, the lens image obtaining part 42 generates the lens image to be less prominent than an object image and a mapping image by controlling the brightness of the lens image and displaying the lens image with light colors (for example, translucence and sepia color). The image data of the obtained lens image is appropriately outputted to the lens image data obtaining part 43 and the image generation part 47. In the embodiment, a moving image is obtained as the lens image. Although the lens supporting member 4b and the lens pressing member 4c are actually photographed in the lens image, these are omitted in the lens image shown in FIGS. 5 to 7 for simplifying the understanding.

The lens image data obtaining part 43 extracts the image of the test lens L from the lens image obtained by the lens image obtaining part 42 with a known technique (for example, a technique of detecting features such as an edge (contour), a corner and a dot by contrast adjustment, shape matching and the like). In the embodiment, the lens image data obtaining part 43 extracts the outer circumference edge of the test lens L from the lens image, in order to extract the image of the test lens L. Moreover, the lens image data obtaining part 43 detects the coordinate data (position information) of the outer circumference edge on the lens image, namely, the coordinate data in the coordinate system of the imaging element 32 (hereinafter referred to as imaging coordinate system). The inside of the outer circumference edge is defined as a lens region occupied by the test lens L. An eyeglass frame may be obtained as the outer circumference edge, and the outer circumference edge of the test lens L itself may be obtained as the outer circumference edge when rimless glasses are used. The coordinate data of the extracted outer circumference edge in the imaging coordinate system is outputted to the coordinate data obtaining part 45 and the image generation part 47.

When a mark is applied to the test lens L, the lens image data obtaining part 43 extracts the mark, and detects the coordinate data of the mark in the imaging coordinate system. The image of the extracted mark and the coordinate data in the imaging coordinate system are outputted to the coordinate data obtaining part 45 and the image generation part 47.

Figure 9:
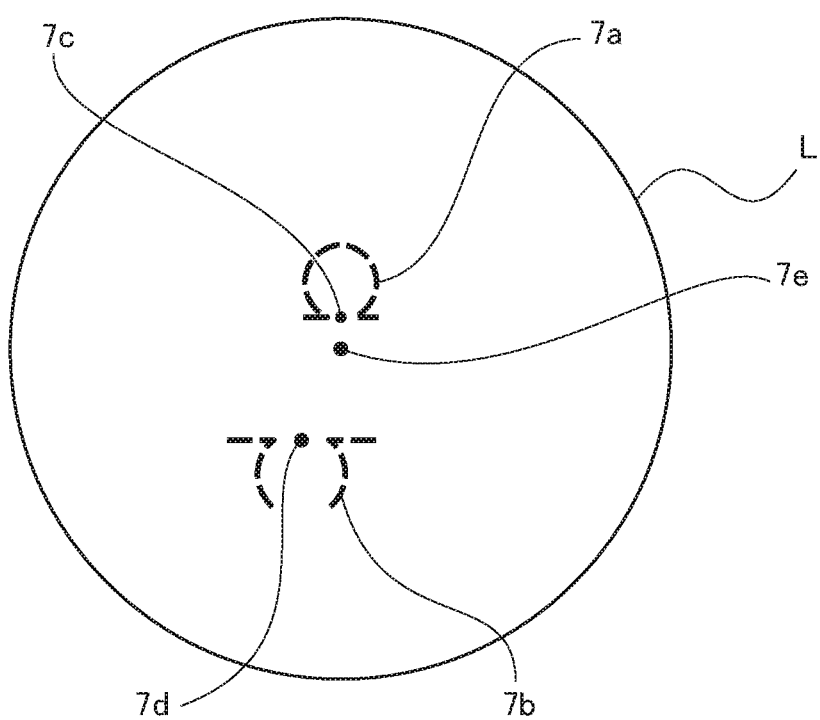
FIG. 9 is a plan view illustrating one example of an unprocessed lens on which a mark is printed or a lens mark is stamped by ink.

Note that "mark" means a mark directly drawn, stamped, and applied to the test lens L, and includes a stamped mark by lens stamping ink, a magic mark showing an eye point, a paint mark, seal, and a hidden mark. When the test lens L is an unprocessed lens, a far-sight power measurement position mark 7a, an add power measurement position mark 7b, a far-sight eye point mark 7c, a near-sight eye point mark 7d, and a prism measurement point 7e are printed and stamped by ink, as illustrated in FIG. 9.

When the mark is not applied by magic or ink, for example, the maker and the type of the lens can be specified based on the far-sight power measurement positon (F-point) and the near-sight power measurement point (N-point) detected from the mapping image and the hidden mark, and the type of the mark provided in the test lens L and the position where the mark is provided can be obtained from the data base.

The optical property calculation part 44 calculates the optical characteristic values in a predetermined measurement position of the test lens L based on the image signals inputted from the measurement light receiving element 23, namely, the pattern image formed in the measurement light receiving element 23. The optical characteristic values include spherical power, cylindrical power, a cylindrical axis angle, prism degree, and a prism base direction.

The numerical data of the calculated optical characteristic values is outputted to the coordinate data obtaining part 45. Note that "measurement position of test lens L" means the position of the measurement optical axis Lm on the test lens L when the measurement light emitted from the projection optical system 10 enters.

In this case, the imaging signal includes information about the light receiving position and the shape of the light receiving image for each of the received divided measurement light fluxes. The information about the light receiving position is represented as the position (coordinate data) on the pixels of the measurement light receiving element 23. As the light receiving position of each divided measurement light flux is displaced on the measurement light receiving element 23 according to the optical characteristic values of the test lens L, the shape of the projection pattern formed on the measurement light receiving element 23 is reduced, enlarged or distorted. The optical property calculation part 44 obtains the optical characteristic values of the test lens L by analyzing the projection pattern of the divided measurement light fluxes.

The coordinate data obtaining part 45 obtains the coordinate data of the measurement position of the test lens L as the position information. The imaging part 30 is provided on the measurement optical axis Lm of the measurement optical system K, and the center of the imaging element 32, namely, the center of the lens image is aligned with the measurement optical axis Lm. The coordinate data of the measurement position can be therefore obtained based on the positional relationship between the lens image and the measurement optical axis Lm. Hereinafter, the procedure of obtaining the coordinate data of the measurement position is described with reference to FIG. 8.

Figure 8:
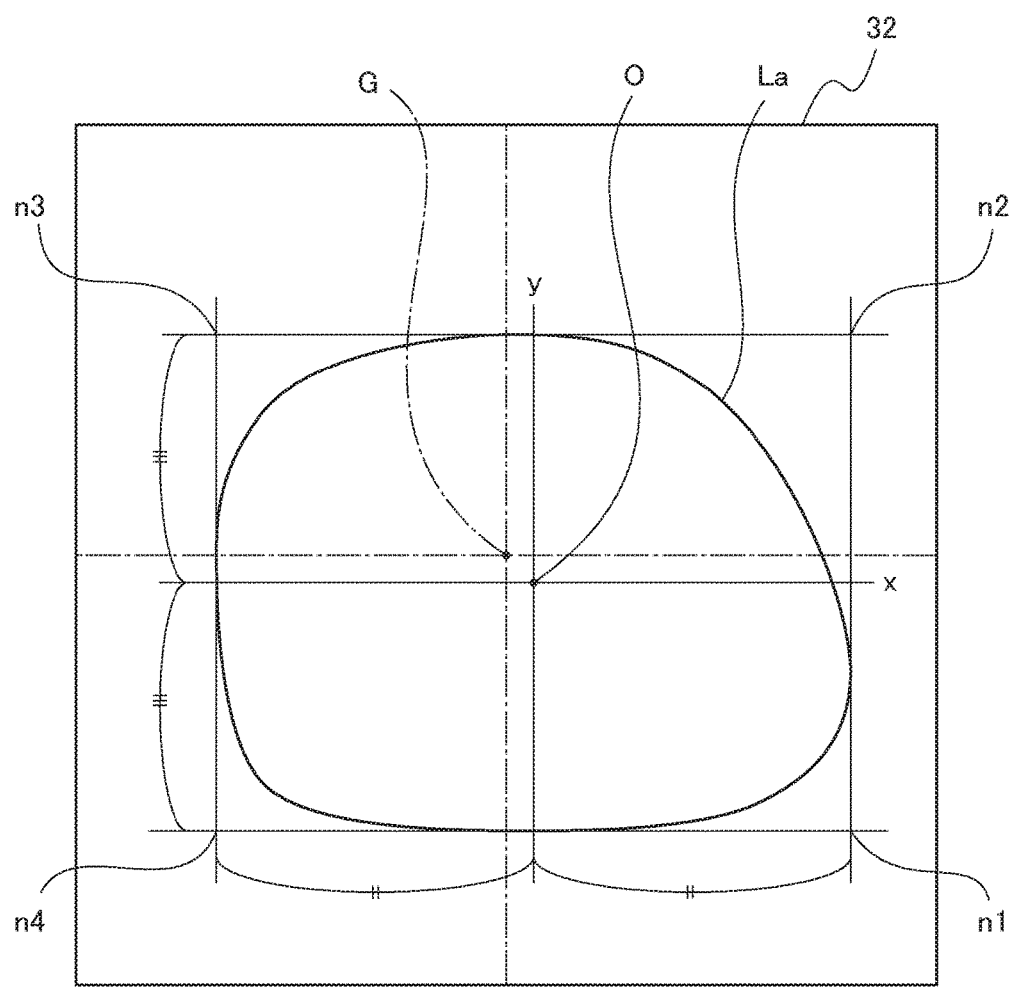
FIG. 8 is a view explaining a positional relationship between a lens image and a measurement optical axis.

FIG. 8 is a view explaining the positional relationship between the lens image and the measurement optical axis Lm, and shows the image of the coordinate of the imaging element 32 and the lens image photographed by the imaging element 32. In FIG. 8, G denotes the center of the imaging element 32 (hereinafter, referred to as imaging center G), and shows the positon of the measurement optical axis Lm. This imaging center G is the origin of the imaging coordinate system. In FIG. 8, La denotes the outer circumference edge of the test lens L, and the inside of the outer circumference edge La is defined as the lens region actually occupied by the test lens L.

The coordinate data obtaining part 45 detects the center of the test lens L (hereinafter referred to as lens center O) based on the coordinate data of the outer circumference edge La of the test lens L obtained by the lens image data obtaining part 43 in the imaging coordinate system. At first, intersection points n1, n2, n3, n4 of the extended lines of the lowermost end, the uppermost end, the leftmost end, and the rightmost end of the outer circumference edge La are extracted, as illustrated in FIG. 8. The intersection point of the bisector of the uppermost end and the lowermost end and the bisector of the leftmost end and the rightmost end is defined as the lens center O. The coordinate data of the lens center O in the imaging coordinate system can be calculated based on the coordinate data of the intersection points n1 to n4. The coordinate data obtained at a predetermined one point or a plurality of points may be used for obtaining the coordinate data of the lens center O in view of the inclination of the test lens L, for example, in addition to the above intersection points n1 to n4.

The coordinate data of the measurement position (imaging center G) on the test lens L (lens region) is calculated based on the coordinate data of the calculated lens center O and the coordinate data (origin (0, 0)) of the imaging center G. Namely, the coordinate data of the measurement position (imaging center G) in the imaging coordinate system is converted into the coordinate data in the coordinate system (hereinafter referred to as lens coordinate system) with the lens center O as the origin. By using the lens coordinate system as just described, the measurement position on the test lens L can be reliably specified even though the image of the test lens L is moved to any of the positions in the lens image (in imaging element 32). In addition, the coordinate data obtaining part 45 obtains the coordinate data of the mark extracted by the lens image data obtaining part 43 in the lens coordinate system.

In the embodiment, the position information of the test lens L with respect to the measurement optical axis Lm can be mechanically specified based on the position information of the lens table 4d in the Y-axis direction, which is outputted from the position detection sensor 4g, and the X-axis position information of the slider 4f, which is outputted from the position detection sensor 4g. In the embodiment, the coordinate data obtaining part 45 supplementarily uses the mechanically specified position information of the test lens L when obtaining the coordinate data of the measurement position based on the lens image. The coordinate data of the measurement position can be therefore used for an error process and the like with high accuracy. The calculated coordinate data of the measurement positon is linked with the optical characteristic values to be accumulated in the internal memory 40a, and outputted to the map formation part 46 and the image generation part 47.

The map formation part 46 forms a mapping image showing the distribution of the optical characteristic values of the test lens L. The optical characteristic values of each measurement position are linked with the coordinate data of the measurement position, and the linked data is inputted to the map formation part 46 from the coordinate data obtaining part 45. The map formation part 46 forms the mapping image showing the distribution of the optical characteristic values of the test lens L by color according and connecting the measurement positions having equal optical characteristic values of the optical characteristic values in the respective measurement positions with an equal power line such as a contour line. In addition, a more precise mapping image may be formed or a high quality mapping image with smoother contour lines may be formed by estimating the optical characteristic values of the position where the optical characteristic values are not measured based on the optical characteristic values and the coordinate data, and further inserting the contour lines between the contour lines. The mapping image includes a mapping image showing a distribution of spherical power, a mapping image showing a distribution of cylindrical power, a mapping image showing a distribution of spherical power and cylindrical power, and a mapping image showing a distribution of prism degree. The mapping image to be formed may be predetermined or the mapping image to be formed may by designated by a measurer's operation of the operation part 6. The image data of the formed mapping image is outputted to the image generation part 47.

In the embodiment, the map formation part 46 analyses the optical characteristic values and the coordinate data of the measurement position to detect the optical feature point of the test lens L, and detects the coordinate data of the feature point on the mapping image (namely, lens coordinate system). Note that "feature point of test lens L" means an optical feature portion of the test lens L, and includes a far-sight power measurement position (F-point) and a near-sight power measurement position (N-point) of the test lens L, a center line of a progressive band, and a progressive band length. The coordinate data of the detected feature point is linked with the type of the feature point to be outputted to the image generation part 47.

An eye point (for example, far-sight eye point and near-sight eye point) can be calculated in association with the F-point and the N-point detected from the mapping image. The values of F-points and N-points of various test lenses L for respective makers are linked with the coordinate data of the positions of the eye points and the linked coordinate data and the values are previously stored in the memory 41. The coordinate data of the corresponding eye point is extracted from the memory 41 based on the F-point and the N-point detected from the mapping image. The coordinate data is also linked with the eye point to be outputted to the image generation part 47.

The image generation part 47 generates a first superimposed image I1 (refer to FIG. 5) which is displayed on the display screen 3a while measuring the optical characteristic values of the test lens L and a second superimposed image I2 (refer to FIG. 7) which is displayed on the display screen 3a after measuring the test lens L.

The image generation part 47 generates the first superimposed image I1 by superimposing an object image onto the lens image obtained by the lens image obtaining part 42. The first superimposed image I1 includes symbols for supporting the measurement of the optical characteristic values and the measured optical characteristic values.

Figure 5:
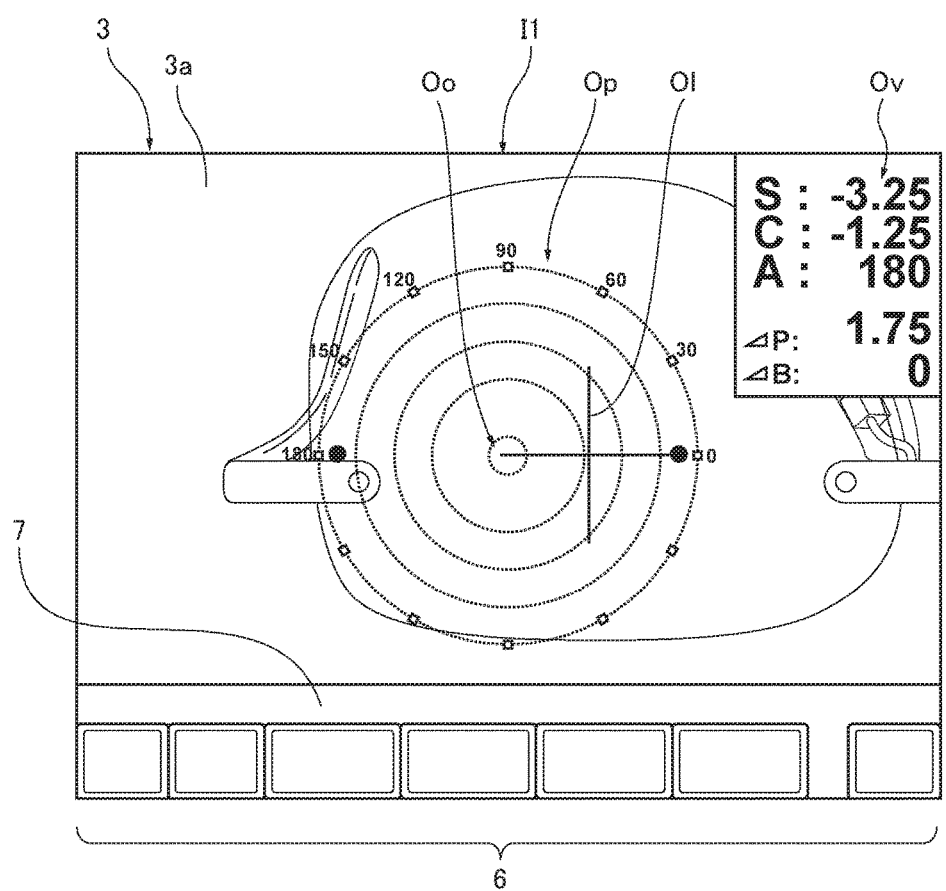
FIG. 5 is a view explaining one example of a first superimposed image which is displayed on a display screen while measuring optical characteristic values in the lens meter of the embodiment.

When generating the first superimposed image I1, the image generation part 47 generates, as the object image, a measurement optical axis symbol Oo showing the position of the measurement optical axis Lm of the measurement optical system K, a lens optical axis symbol Ol showing the position of the lens optical axis L1 of the test lens L, and a prism circle symbol Op (hereinafter referred to as P circle symbol Op) gradually showing the prism amount, and superimpose these symbols onto the lens image (refer to FIGS. 5, 6). The measurement optical axis Oo shows the optical axis center position of the lens meter 1 (measurement optical system K), namely, the position (gravity center position of pattern formed by pattern plate 22b) occupied by the measurement optical axis Lm when the test lens L is not provided in the measurement optical system K. In the embodiment, the measurement optical axis symbol Oo is shown as the center of the P circle symbol Op. The lens optical axis symbol Ol shows the position of the lens optical axis L1 of the test lens L, and is shown by a cross mark in the embodiment. The optical axis L1 is an optical central position in the test lens L, and is positioned (position where prism amount is 0) to allow the passage of the incident light without being refracted. The lens optical axis symbol Ol shows the position of the lens optical axis L1 to operate as the lens position symbol showing the position of the test lens L. The P circle symbol Op gradually shows the prism amount in the position on the measurement optical axis Lm of the test lens L. The P circle symbol Op is shown by a plurality of concentric circle symbols. In the embodiment, each of the concentric circular symbols is drawn by connecting the equal prism values to make a circle with the position of the measurement optical axis Lm as the center, and a plurality of concentric circular symbols is positioned in order such that the outermost circular symbol has the largest prism values among a plurality of circular symbols.

The image generation part 47 generates a measurement value display Ov showing the optical characteristic values of the test lens L calculated by the optical property calculation part 44 to superimpose the measurement value display Ov onto the right side portion of the lens image. In the embodiment, as the measurement value display Ov, the numeral value data of the spherical power, the cylindrical power, and the axis angle is displayed on the right side of the symbols S, C, A, and the numerical value data of the prism degree and the prism base direction is displayed on the right side of the symbols ΔP, ΔB. In the case of a progressive lens, the numeral value data of the add power is displayed on the right side of the symbol ADD. In addition to the data, a pupillary distance (distance between optical centers) may be displayed and symbols such as R (right) and L (left) may be displayed to distinguish a left lens and a light lens while measuring.

The image generation part 47 may generate a first superimposed image I1' in which a match symbol Om is superimposed onto the lens image. The match symbol Om surrounds the position of the measurement optical axis Lm (measurement optical axis symbol Oo) with the four divided thick frames to highlight the position of the measurement optical axis Lm when the measurement optical axis symbol Oo and the lens optical axis symbol Ol come close to each other by the movement of the test lens L. The match symbol Om may be colored with, for example, green or pink according to the distance between the measurement optical axis symbol Oo and the lens optical axis symbol Ol to be superimposed.

The image generation part 47 generates the object image of the comment bar 7 according to needs, and superimposes this image to generate the first superimposed image I1, I1'. For example, when the lens meter 1 determines the test lens L as an aspheric lens, the image generation part 47 generates the object image on which the text of "aspheric lens" lights up, as illustrated in FIG. 6. The display of such an object image as the comment bar 7 encourages a measurer to measure the optical characteristic values in a plurality of positions by moving the test lens L in order to obtain the mapping image. The image generation part 47 may adjust the generated first superimposed images I1, I1' to obtain an image including at least a part of the outer circumference edge of the test lens L based on the coordinate data of the outer circumference edge of the test lens L in the lens image detected by the lens image data obtaining part 43. Namely, at least a part of the outer circumference edge of the test lens L is photographed in the first superimposed images I1, I1' by adjusting the display range of the lens image and the object image. The measurer can thus clearly distinguish the lens region of the test lens L, and easily measure the test lens L at a desired position through the support of the measurement operation of the optical characteristic values.

The image generation part 47 superimposes the mapping image formed by the map formation part 46 onto the lens image obtained by the lens image obtaining part 42 to generate a second superimposed image I2.

In this case, the image generation part 47 may adjust the display region of the lens image and the mapping image to photograph at least a part of the outer circumference edge of the test lens L in the second superimposed image I2. The lens region of the test lens L is thereby clearly distinguished, which allows a measurer to more clearly recognize the positional relationship between the distribution of the optical characteristic values and the test lens L. In this case, in order to clearly distinguish the lens region, the object image which highlights for example the outer circumference edge may be superimposed.

In the embodiment, the image generation part 47 superimposes, onto the lens image and the mapping image, the objet image showing the position of the feature point of the test lens L on the mapping image and the object image showing the position of the mark provided in the test lens L on the lens image to generate the second superimposed image I2. In this case, each object image is superimposed onto the lens image based on the coordinate data of each mark on the lens image and each feature point obtained by the coordinate data obtaining part 45. The object image of the measurement value display Ov may be superimposed or the object image of the comment bar 7 may be superimposed when displaying comments.

The generated second superimposed image I2 may be discarded when completing the measurement or may be stored in the memory 41. The coordinate data and the optical characteristic values of each measurement position may be linked with the second superimposed image I2 to be stored in the memory 41. The second superimposed image I2 and the optical characteristic values can be redisplayed on the display screen 3a according to needs through the storing in the memory 41.

Figure 7:
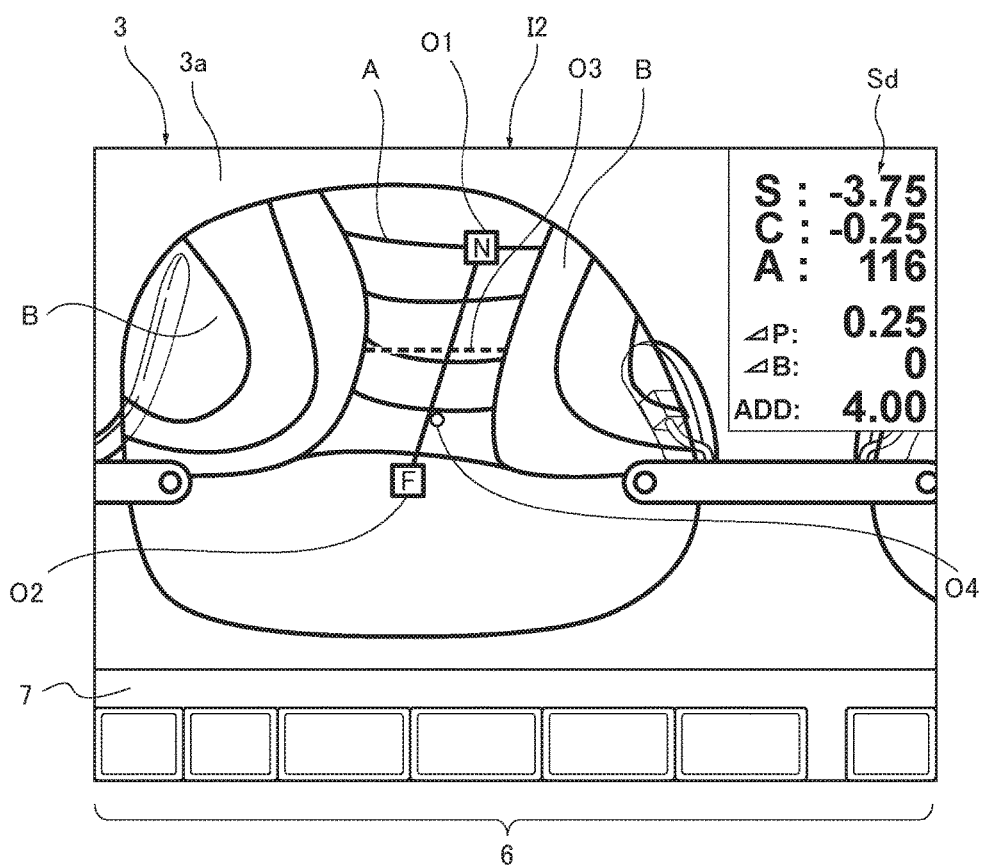
FIG. 7 is a view explaining one example of a second superimposed image which is displayed on the display screen after measuring the optical characteristic values in the lens meter of the embodiment.

FIG. 7 shows one example of the second superimposed image I2 when the test lens L is a progressive lens. In the second superimposed image I2 shown in FIG. 7, the mapping image is superimposed onto the lens image. The mapping image shows a change in the add power (spherical power) of the progressive band A and the distortion of the left and right region B of the progressive band A with an equal power line or color-coding (color map). The measurement value display Ov as the object image is superimposed onto the second superimposed image I2 of FIG. 7.

Moreover, the symbol F as the object image 02 showing the position of the far-sight power measurement position (F-point), the symbol N as the object image 01 showing the position of the near-sight power measurement position (N-point), and a dotted line as the object image 03 showing the position of the progressive band center line are superimposed onto the second superimposed image I2 shown in FIG. 7.

Furthermore, the symbol o is superimposed as an object image 04 which is a mark extracted by the lens image data obtaining part 43 and shows a magic mark of a far-sight eye point of an actual wearer of glasses. When the marks as shown in FIG. 9 are extracted by the lens image data obtaining part 43, the object image showing these marks may be generated to be superimposed onto the second superimposed image I2. These marks may be unclear even though these are photographed in the lens image, or may be invisible by superimposing the mapping image onto the lens image. For this reason, by superimposing the object image in which the marks are highlighted onto the lens image, a measurer can clearly recognize the marks. In the embodiment, although the object image is generated by extracting the marks from the lens image as described above, the generation of the object image is not limited thereto. Both the lens image and the mapping image may be half transparent images such that the marks become visible even when the mapping image is superimposed, and these half transparent lens image and mapping image may be superimposed to generate the second superimposed image I2.

The display control part 48 outputs the image data of the first superimposed images I1, I1' and the second superimposed image I2 generated by the image generation part 47 to the display part 3, and displays these images onto the display screen 3a. By the control of the control part 40, while measuring the optical characteristic values, the first superimposed image I1, I1' is displayed on the display screen 3a and the second superimposed image I2 is displayed on the display screen 3a after the measurement.

Image Control Process

Hereinafter, one example of the image control process in the lens meter 1 of the embodiment is described in details with reference to the flowchart in FIG. 10. As soon as the lens meter 1 (control part 40) detects the test lens L (for example, when the lens meter 1 detects a change in the shape of the projection pattern on the measurement light receiving element 23), the lens meter 1 starts the image control process.

Upon the start of the image control process, in Step S1, the imaging part 30 starts photographing the test lens L under the control of the control part 40. The photographed image data is sequentially outputted to the lens image obtaining part 42. In Step S2, the measurement optical system K starts measuring the optical characteristic values of the test lens L. The optical characteristic values of the test lens L are measured by projecting the measurement light to the test lens L from the light source 11 of the projection optical system 10, and receiving the image of the measurement light which has passed through the test lens L by the measurement light receiving element 23 under the control of the control part 40.

Next, in Step S3, the lens image obtaining part 42 obtains the lens image by executing a necessary image process and processing relative to the image data inputted from the imaging part 30. Next, in Step S4, the lens image data obtaining part 43 extracts the outer circumference edge La of the test lens L from the lens image obtained in Step S3, and obtains the coordinate data of the outer circumference edge La in the imaging coordinate system.

In Step S5, the optical property calculation part 44 calculates the optical characteristic values such as the spherical power, the cylindrical power, the cylinder axis angle, the prism degree, and the prism base direction in the measurement positon of the test lens L based on the measurement data of the test lens L, namely, the image signals inputted from the measurement light receiving element 23.

In Step S6, the coordinate data obtaining part 45 extracts the intersection points n1, n2, n3, n4 based on the coordinate data of the outer circumference edge La in the imaging coordinate system extracted in Step S4, and calculates the coordinate data of the lens center O. The coordinate data obtaining part 45 calculates the coordinate data in the present measurement position of the optical characteristic values (imaging center G) in the lens coordinate system based on the coordinate data of the lens center O and the coordinate data of the imaging center G. The coordinate data is linked with the optical characteristic values to be accumulated in the internal memory 40a.

In Step S7, the image generation part 47 superimposes the measurement optical axis symbol Oo, the P circle symbol Op, the lens optical axis symbol Ol and the measurement value display Ov based on the measurement data of the test lens L onto the lens image to generate the first superimposed image I1.

In this case, when the distance between the measurement optical axis symbol Oo and the lens optical axis symbol Ol is equal to a predetermined distance or below, the match symbol Om is superimposed onto the lens image to generate the first superimposed image I1 When the test lens L is determined as an aspheric lens, the image generation part 47 superimpose the object image of the comment bar 7 in which the texts of "ASPHERIC LENS" lights up onto the first superimposed images I1, I1'.

Next, in Step S8, the display control part 48 displays the first superimposed image I1 or the first superimposed image I1' generated in Step S7 on the display screen 3a. The lens image showing the movement of the test lens L and the lens optical axis symbol Ol which moves according to the position of the test lens L are displayed on the display screen 3a as a real time moving image. Accordingly, a measurer can easily execute the measurement operation while comparing the lens image with the symbols and the texts which support the measurement such as the measurement optical axis symbol Oo, the lens optical axis symbol Ol, and the P circle symbol Op on the display screen 3a.

When the comment bar 7 in which the texts of "ASPHERIC LENS" lights up is displayed on the first superimposed image I1, I1', a measurer can recognize that the test lens L is an aspheric lens. A measurer can thus measure the optical characteristic values of the entire lens surface by appropriately moving the test lens L to generate the mapping image.

In Step S9, it is determined whether or not the measurement of the test lens L is completed. When the determination result is YES, the process proceeds to Step S10. When the determination result is NO, the process returns to Step S3 to repeat the processes of Steps S3 to S8 and to measure the optical characteristic values of the test lens L in another measurement position. By repeating the processes of Step S3 to S8, the optical characteristic values can be obtained in a plurality of measurement positions.

For example, when the operation signal which completes the measurement is received from the operation part 6, it is determined that the measurement is completed. Otherwise, it is determined that the measurement is not completed. When it is determined that the test lens L is determined as a spherical lens or the measurement of the optical characteristic values sufficient for generating the mapping image in a plurality of measurement positions is completed, it may be determined that the control part 40 completes the measurement. It may be determined that the measurement is completed when the operation signal for printing the measured optical characteristic values with a printing part or the operation signal for sending the measurement data outside is received from the operation part 6. When the test lens L is determined as a spherical lens in Step S9, the subsequent steps S10 to S13 may be appropriately omitted.

Next, in Step S10, the map formation part 46 forms the mapping image showing the distribution of the optical characteristic values on the test lens upon the completion of the measurement of the optical characteristic values. The map formation part 46 generates the mapping image by connecting the measurement positions having the equal optical characteristic values with the equal power lines based on the optical characteristic values measured in a plurality of measurement positions stored in the internal memory 40a and the coordinate data of each measurement position in the lens coordinate system. In addition, as the coordinate data in each measurement position is converted into the lens coordinate system, the coordinate system of the mapping image coincides with the lens coordinate system.

The map formation part 46 analyses the coordinate data of the measurement positon and the optical characteristic values according to needs, detects the feature point (far-sight power measurement position, near-sight power measurement position, progressive band center line and the like) of the test lens L, and detects the coordinate data of the position of this feature point on the mapping image.

Next in Step S11, when the mark (magic mark of eye point, seal, printing and stamping of far-sight power measurement position by ink) is provided in the test lens L photographed in the lens image through the analysis of the lens image obtained in Step S3, the mark is extracted. The coordinate data of the obtained mark in the imaging coordinate system is also obtained. The coordinate data in the imaging coordinate system is converted into the coordinate data in the lens coordinate system by the coordinate data obtaining part 45.

The mark may be extracted and the coordinate data may be obtained when the outer circumference edge is extracted from the lens image in Step S4. In this case, it is not necessary to extract the mark every time Step 4 is repeated, and the mark is extracted in the first Step S4. The mark may be extracted in any timing as long as the mark is extracted until the second superimposed image I2 is generated. If it is not necessary to superimpose the mark onto the second superimposed image I2 to be displayed, the process of Step S11 can be omitted.

In Step S12, the image generation part 47 generates the second superimposed image I2 in which the mapping image generated in Step S10 is superimposed onto the lens image obtained in Step S3. In this case, the coordinate system of the mapping image conforms to the lens coordinate system. Thus, the image generation part 47 can easily generate the second superimposed image I2 by superimposing the mapping image onto the lens image with the lens center O of the test lens L on the lens image as a standard. The object image showing the feature point of the test lens L detected in Step S10 and the object image showing the mark which is extracted in Step S11 and is provided in the test lens L are superimposed onto the second superimposed image I2. The object image which highlights the outer circumference edge may be superimposed onto the second superimposed image I2.

In the embodiment, the lens image is a moving image, and the coordinate system of the mapping image conforms to the lens coordinate system with the lens center O as the origin. Thus, the second superimposed image I2 is generated in which the mapping image and the object image such as a feature point and a mark move following the movement of the test lens L photographed in the lens image.

In Step S13, the display control part 48 outputs the image data of the second superimposed image I2 generated in Step S12 to the display part 3, and displays the second superimposed image I2 on the display screen 3a of the display part 3. In this case, the second superimposed image I2 may be displayed such that the image of the test lens L has the same size as the actual test lens L. Alternatively, the second superimposed image I2 may be enlarged to be displayed or reduced to be displayed. A measurer can visually recognize the distribution of the optical characteristic values of the test lens L and the positional relationship between the distribution and the test lens L by visually recognizing the second superimposed image I2. In the embodiment, the lens image is a moving image which allows a measurer to see the mapping image and the lens image of the test lens L photographed by the imaging part 30 in real time. The second superimposed image I2 displayed on the display screen 3a can be printed by a printing part by the operation from the operation part 6.

In Step S14, the second superimposed image I2 is stored in the memory 41 (non-volatile memory) according to needs. The coordinate data and the measurement data of the optical characteristic values of each measurement position may be stored in the memory 41 along with the second superimposed image I2. The second superimposed image I2 and the optical characteristic values may be read out from the memory 41 according to needs to be redisplayed on the display screen 3a.

After that, the process proceeds to Step S15, the photographing by the imaging part 30 is completed to complete the image control process under the control of the control part 40. The process in Step S15 is executed when a measurer executes the completion operation with the operation part 6, and the control part 40 receives the signal.

As described above, one example of the image control process is described above with reference to the flowchart of FIG. 10. However, the image control process is not limited to the above example. In the above example, the mapping image is formed, the second superimposed image I2 is generated, and the second superimposed image I2 is displayed through the processes of Steps S10 to S13 after the measurement of the necessary optical characteristic values is completed. However, as a modified example, when the second superimposed image I2 is generated at the same time as the measurement of the optical characteristic values, the processes of Steps S10 to S13 can be executed at the same time as the processes of Steps S7, S8 in the loop of Steps S3 to S9. More specifically, while the first superimposed image I1 is displayed and a measurer measures the optical characteristic values, the mapping image is formed and the second superimposed image I2 is generated in real time based on the obtained optical characteristic values, and a part of the first superimposed image I1 may be changed with the second superimposed image I2 to be displayed. A measurer can therefore measure the optical characteristic values while visibly recognizing not only the first superimposed image I1 but also the second superimposed image I2 in the region where the mapping image is formed, so that the measurer can clearly find out the position for measuring the optical characteristic values. Consequently, the optical characteristic values can be more smoothly and effectively measured by avoiding the measurement in an unnecessary position.

One example of the operation of the lens meter 1 of the embodiment is described. Hereinafter, an example in which the optical characteristic values of a pair of test lenses L of rimless glasses (two points) using a progressive lens as the test lens L as shown in FIG. 5 is described in the embodiment.

When the lens meter 1 of the embodiment detects the test lens L, the process proceeds from Step S1 to Step S6 through Step S2, Step S3, and Step S4 in the flowchart of FIG. 10 to obtain the optical characteristic values and the coordinate data in a predetermined measurement position. Next, the process proceeds from Step S7 to Step S8, and the object image including the measurement optical axis symbol Oo, the P circle symbol Op, the lens optical axis symbol Ol, and the measurement value display Ov is superimposed onto the lens image, and the first superimposed image I1, I1' shown in FIGS. 5, 6 is generated according to the distance between the measurement optical axis symbol Oo and the lens optical axis symbol Ol to be displayed on the display screen 3a.

Figure 6:
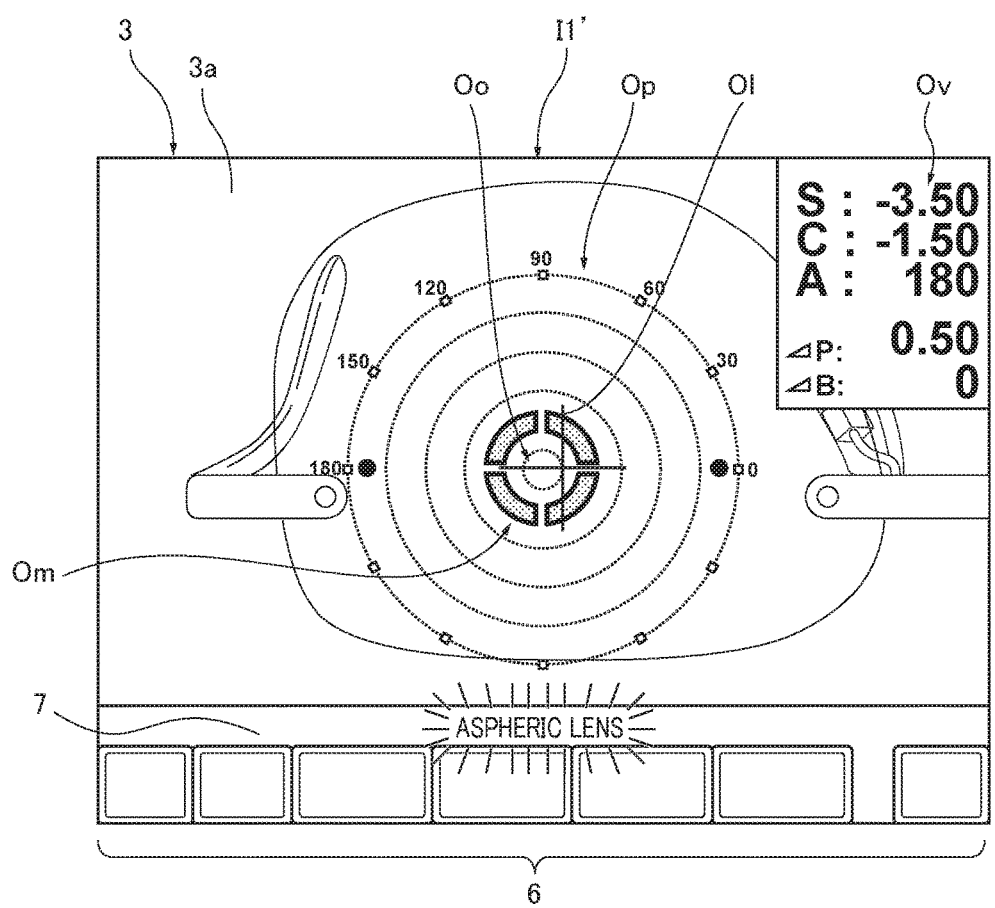
FIG. 6 is a view explaining one example of the first superimposed image which is displayed on the display screen while measuring the optical characteristic values in the lens meter of the embodiment, and illustrating a lens bar and a condition in which a measurement optical axis symbol and a lens optical axis mark are located closer to each other than the condition in FIG. 5.

As the test lens L is a progressive lens, the objet image of the comment bar 7 in which the text of "ASPHERIC LENS" lights up is superimposed onto the first superimposed image I1' shown in FIG. 6, for example, to be displayed on the display screen 3a. A measurer moves the test lens L by visibly recognizing the comment bar 7, and starts measuring the optical characteristic values in a plurality of portions so as to generate the mapping image.

Therefore, the determination result in the next Step S9 is NO, and the process returns to Step S3. Then, the process proceeds from Step S4 to Step S6 through Step S5 to obtain the optical characteristic values and the coordinate data in different measurement positions. Next, the process proceeds from Step S7 to Step S8 to generate the first superimposed image I1, I1' to be displayed on the display screen 3a.

The measurement operation as described above is repeated in a plurality of measurement positions of the test lens L. In addition, these measurement positions are automatically specified by the control part 40 based on the movement of the test lens L, or manually specified by operating the operation part 6 when a measurer moves the test lens L such that a desired measurement position reaches a mechanical center position.

In this case, in order to measure the optical characteristic values of a pair of lenses of the rimless glasses, after one of the test lenses L is measured and the second superimposed image I2 is displayed, the other of the test lenses L is measured and the second superimposed image I2 is displayed. However, the measurement of the optical characteristic values is not limited to this procedure. The optical characteristic values of the other of the test lenses L may be measured in a plurality of portions following the measurement of the optical characteristic values of the one of the test lenses L in a plurality of positions, and then the second superimposed images I2 may be displayed.

After the coordinate data and the optical characteristic values in necessary measurement positions are obtained (Yes in Step S9), the process proceeds to Step S10 to form the mapping image showing the distribution of the optical characteristic values of the test lens L based on the obtained optical characteristic values and the coordinate data. The coordinate data and the feature point of the test lens L are detected based on the optical characteristic values, the coordinate data, and the mapping image of the test lens L according to needs. In this case, as the test lens L is a progressive lens, the far-sight power measurement position (F-point), the near-sight power measurement position (N-point), and the progressive band center line are detected as the feature points.

After the mapping image is formed, the process proceeds to Step S11 to analyze the lens image and extract the mark provided in the test lens L while detecting the coordinate data of the mark. In this case, the magic mark showing a far-sight eye point, which is provided on the test lens L as the mark, for an actual wearer of glasses is extracted. After the mapping image is formed as described above, the coordinate data of the feature point of the test lens L is detected, and the coordinate data of the mark is extracted, the process proceeds to Step S12 to superimpose the mapping image showing the distribution of the optical characteristic values onto the lens image, to superimpose the object image showing the feature points (far-sight power measurement position, near-sight power measurement position, progressive band center line) onto the positions of the feature points of the test lens L, and generate the second superimposed image I2 (refer to FIG. 7) in which the object image showing the mark is superimposed onto the position of the mark (magic mark of eye point) provided in the test lens L. FIG. 7 shows the second superimposed image I2 of one of the test lenses L of the rimless glasses. However, when the optical characteristic values of a pair of test lenses are continuously measured, the second superimposed image I2 may be generated by superimposing the mapping image of each of a pair of the test lenses L onto the lens image showing the entire rimless glasses.

After the second superimposed image I2 is generated, the process proceeds to Step S13 to display the second superimposed image I2 on the display screen 3a. After that, the process proceeds to Step S14 to store the second superimposed image I2 in the memory 41. Upon the receiving of a signal of instructing the completion by a measurer's operation of the operation part 6, the process proceeds to Step S15 to finish photographing in the imaging part 30, so that the image control process is completed.

As described above, in the lens meter 1 in the embodiment, the mapping image is generated, which shows the distribution of the optical characteristic values of the test lens L based on the optical characteristic values and the position information (coordinate data) of the measurement position of the optical characteristic values, and the second superimposed image in which the mapping image is superimposed onto the lens image is generated to be displayed on the display part 3. A measurer can therefore simultaneously recognize the distribution of the optical characteristic values of the test lens L and the external appearance of the test lens L by watching the display part 3, and easily recognize the positional relationship between the distribution of the optical characteristic values and the test lens L.

In the embodiment, the coordinate data of the measurement position in the lens region is obtained based on the positional relationship between the lens center O of the image of the test lens L obtained from the lens image and the imaging center G where the measurement optical axis Lm is located, and the mapping image is formed. The mapping image can be thus superimposed onto the image of the test lens L even though the test lens L is photographed in any position in the lens image.

In the embodiment, the feature point of the test lens L is detected based on the optical characteristic values of the test lens L, and the object image showing the feature point of the test lens L2 is superimposed onto the second superimposed image I2.

The feature point (far-sight power measurement position, near-sight power measurement position, and progressive band center line) of the test lens L is thereby highlighted and is displayed on the display part 3. A measurer can easily confirm the far-sight power measurement position, the near-sight power measurement position, and the progressive band center line in the test lens L. The positional relationship between the feature point of the test lens L and the test lens L can be easily recognized.

When the mark (magic mark of eye point, seal, printing and stamping of far-sight power measurement position by ink) is provided in the test lens L, the mark may be hidden by the mapping image superimposed on the lens image. For this reason, in the embodiment, the mark is detected from the lens image, and the object image showing the mark is superimposed onto the second superimposed image I2.

The position of the mark provided in the test lens L can be thereby clearly recognized even though the mapping image is superimposed onto the lens image, and the positional relationship between the test lens L, the distribution of the optical characteristic values, and the mark can be also clearly determined.

Moreover, the control part 40 (image generation part 47) may generate the second superimposed image I2 to have a real-size image of the test lens L, and to display the second superimposed image I2 on the display screen 3a, so that the test lens L is placed on the display screen 3a of the display part 3 to be overlapped with the image of the test lens when displaying the second superimposed image I2 on the display screen 3a.

For example, the following usage patterns may be obtained by displaying the image of the real-size test lens L. After the second superimposed image I2 is confirmed on the display part 3, a measurer removes the test lens L, and places the test lens L on the display screen 3a to be aligned with the image of the test lens L, and to be superimposed onto the mapping image. The positional relationship between the test lens L and the distribution of the optical characteristic values of the test lens L can be thereby more realistically recognized. Moreover, while the test lens L is placed on the display screen 3a, a mark, a feature point and a contour line of the mapping image can be directly written in the test lens, and these can be used to support the processing of the test lens and the fitting of the eyeglasses. The mark and the feature point include as the eye point, the progressive band center line, the N-point, and the F-point. The relationship with the eyeball movement of a wearer can be easily confirmed by writing the feature point and the like in the test lens L.

In contrast, the second superimposed image I2 may be enlarged, which makes easier for a measurer to visibly recognize the optical property of a main section, for example. The second superimposed image I2 may be reduced, which makes a display range wider, so that a measurer can recognize the entire optical property of the test lens L.

In the embodiment, when measuring the optical characteristic values, the first superimposed image I1 is displayed on the display part 3, in which the object image (measurement optical axis symbol Oo) showing the position of the measurement optical axis and the objet image (lens optical axis symbol Ol) showing the position of the lens optical axis of the test lens L are superimposed onto the lens image obtained by the imaging part 30.

A measurer can thus recognize the movement state and the posture of the test lens L by merely watching the display part 3 while measuring the optical characteristic values. Accordingly, an even unfamiliar measurer can adjust the position of the test lens L, and measure the optical characteristic values without seeing an actual test lens L. The optical characteristic values can be measured in a desired measurement position in the lens region without measuring the optical characteristic values in another position except the lens region. The measurement operation is thus supported, so that the measurement data for generating the mapping image can be effectively obtained.

In the embodiment, the second superimposed image I2, the optical characteristic values, and the coordinate data are stored in the memory 41. The distribution of the optical characteristic values and the feature point can be thereby reconfirmed by redisplaying on the display screen 3a the second superimposed image I2 read from the memory 41, for example. Moreover, the deleted mark after putting the lens in an eyeglass frame can be confirmed. Furthermore, the distribution of the optical characteristic values, the feature point, and the mark are written in the lens to be used for supporting the fitting of the eyeglasses.

Although the lens meter 1 of the present invention has been described in terms of exemplary embodiment, the specific configuration thereof is not limited thereto. It should be appreciated that variations or modifications may be made in the embodiment described by persons skilled in the art without departing from the scope of the present invention as defined by the following claims.

For example, in the embodiment, while measuring the optical characteristic values, the first superimposed image I1, I1' in which the object image such as the measurement optical axis symbol Oo and the measurement value display Ov is superimposed onto the lens image is displayed on the display screen 3a. However, it is not limited thereto. For example, while measuring the optical characteristic values, the object image such as the measurement optical axis symbol Oo and the measurement value display Ov is only displayed without being superimposed onto the lens image.

In the embodiment, the example in which the moving image is obtained as a lens image, and the first superimposed image I1, I1' and the second superimposed image I2 are generated is shown. However, it is not limited thereto. For example, a still image may be obtained as the lens image. A still image may be obtained in destination according to the movement of the test lens L when generating the first superimposed image I1, I1', and the object image such as the measurement optical axis symbol Oo may be superimposed onto the still image. The mapping image may be superimposed with the still image of the test lens L when generating the second superimposed image I2.

In the embodiment, the example in which the imaging part 30 is configured by a monocular digital camera disposed on the measurement optical axis Lm of the projection optical system 10 is shown. However, the imaging part 30 may be configured by, for example, a compound eye digital camera or a plurality of monocular digital cameras. When the compound eye digital camera or a plurality of monocular digital cameras is used, the lens image is generated by synthesizing the photographed images. By using the compound eye digital camera or a plurality of monocular digital cameras, the photographing can be performed even in a portion which is concealed by a component and is difficult to be photographed, and the mark and the feature point of the test lens L can be easily detected.

In the embodiment, the example in which the imaging part 30 is built in the upper part 2a of the main body 2, and the imaging part 30 is attached to the position which can image a square region having a 100 mm side with the measurement optical axis Lm as the center is shown. However, it is not limited thereto. The imaging part 30 may be provided in the lens pressing member 4c (position shown by 30B in FIG. 1), the lens table 4d (position shown by 30A in FIG. 1), and the surface of the wall defining the lens setting space 2c formed in the main body 2. The imaging part 30 may be provided in a connection part of the projection optical system 10 and the light receiving optical system 20, or may be provided in the lower part of the light receiving optical system 20 to photograph from the lower side of the light receiving optical system 20 toward the upper side. Namely, the imaging part 30 may be provided in any position as long as the imaging part 30 photographs the test lens L and obtains the lens image.

The lens pressing member 4c and the lens table 4d may be formed by a plate having stiffness higher than that of plastic and the thickness and the width of the these members may be reduced, in order to prevent the imaging of the test lens L from being disturbed. The imaging of the test lens L may be prevented from being disturbed by forming the lens pressing member 4c with transparent resin. In addition, as the region where the lens pressing member 4c is photographed is previously identified, the lens image obtaining part 42 may generate the lens image by deleting these with the image process, or another configuration may be used.

In the embodiment, the example in which the test lens L is a progressive lens is described. However, the test lens L is not limited to the progressive lens. A multifocus lens such as a double focus lens, a triple focus lens, a far-sight lens, a near-sight lens, and an intermediate distance lens can be adapted to the test lens. A single focus lens may also be adapted to the test lens.

Even when a test lens L whose origin is unknown is used, the origin can be identified by obtaining the distribution of the optical characteristic values and the feature point of the test lens L. The distribution of the optical characteristic values and the property standards can be used as reference information for the fitting, putting a lens in an eyeglass frame, and processing of the lens. The operation efficiency can be thus improved. Even when the same unprocessed lens is used, the feature point such as the far-sight power measurement position and the distribution of the optical characteristic values on the test lens may be changed when the lens is processed according to the shape and the length in the up and down and right and left directions of the eyeglass frame in which the lens is put. The feature point and the distribution of the optical characteristic values of the lens after processed or being put in an eyeglass frame may be easily recognized by using the lens meter 1 of the embodiment.

In the embodiment, the coordinate data of the measurement position may be obtained based on both of the positional relationship between the lens center O and the measurement optical axis Lm (imaging center G) of the test lens L photographed in the lens image and the positional relationship between the lens table 4d and the slider 4f from the position detection sensor 4g, 4h. However, it is not limited thereto. The coordinate data of the measurement position may be obtained based on one of the positional relationships.

Even when the coordinate data of the measurement position is obtained based only on the positional relationship between the lens center O of the test lens L photographed in the lens image and the measurement optical axis Lm (imaging center G) of the lens image, the coordinate data in the measurement position may be obtained with high accuracy, and the calculation speed for obtaining the coordinate data can be increased by omitting the calculation process using the position information of the lens table 4d and the slider 4f. This is suitable for the execution with the lens meter 1 without the slider 4f. On the other hand, when the coordinate data in the measurement point is obtained based only on the positional relationship between the lens table 4d and the slider 4f, the coordinate data can be more easily obtained.

In the embodiment, as shown in FIG. 1, the display part 3 is provided in the upper part of the front surface of the main body 2 to be a part of the lens meter 1. However, it is not limited to the example in the embodiment. For example, the display part 3 may be provided in information devices different from the lens meter 1, for example, a personal computer, a tablet terminal, and a smart phone which are connected to the lens meter 1 by wire or wirelessly connected to the lens meter 1. The positional relationship between the distribution of the optical characteristic values and the test lens can be easily obtained by displaying the second superimposed image I2 in which the mapping image is superimposed onto the test lens. Moreover, as these information devices have a high processing performance and a large capacity, the control part 40 and the memory 41 may be provided in these information devices. The image control process can be thereby executed at a faster speed and with higher accuracy, and the highly accurate second superimposed image I2 can be generated to be displayed.

What is claimed is:

1. A lens meter comprising:
   a measurement optical system that projects measurement light to a test lens, and receives the measurement light which has passed through the test lens;
   a control part that calculates an optical characteristic value of the test lens based on the received measurement light, and controls the measurement optical system;
   a display part that displays the optical characteristic value by control of the control part; and
   an imaging part that obtains a lens image of the test lens, wherein
   the control part generates a mapping image showing distribution of the optical characteristic value of the test lens based on the optical characteristic value and position information of a measurement position of the optical characteristic value, generates a superimposed image in which the mapping image is superimposed onto the lens image, and displays the superimposed image on the display part.

2. The lens meter according to claim 1, wherein
the control part extracts an image of the test lens from the lens image, and obtains the position information of the measurement position in the test lens based on a positional relationship between an image of the test lens and a measurement optical axis of the measurement optical system.

3. The lens meter according to claim 1, wherein
the control part calculates an optical feature point of the test lens based on the optical characteristic value of the test lens, and superimpose an object image showing the feature point onto the superimposed image.

4. The lens meter according to claim 1, wherein
the control part extracts a mark provided in the test lens based on the lens image, and superimpose an object image showing the mark onto the superimposed image.

5. The lens meter according to claim 1, wherein the control part displays the superimposed image on the display part such that an image of the test lens has a same size as the test lens in order to dispose the test lens to be overlapped with the image of the test lens on the display part.

6. The lens meter according to claim 1, wherein the control part displays, on the display part, a superimposed image in which at least one of an object image showing a position of a measurement optical axis and an object image showing a position of a lens optical axis of the test lens is superimposed onto the lens image obtained by the imaging part when measuring the optical property value.

* * * * *